Figure 1:
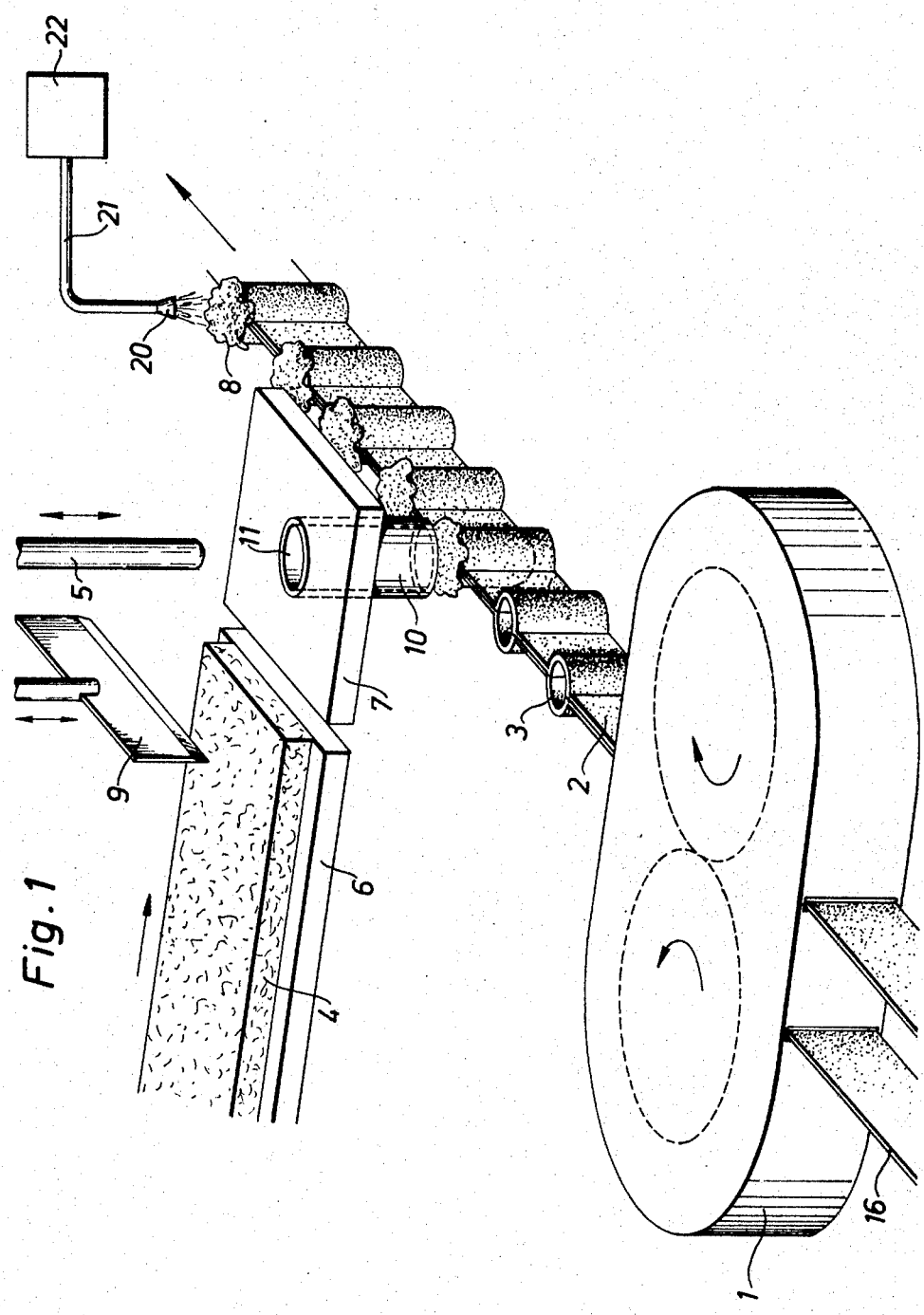

United States Patent [19]
Aslund et al.

[11] 3,729,892
[45] May 1, 1973

[54] METHOD AND A DEVICE FOR MANUFACTURING A PACKAGE CONTAINING A PLURALITY OF EAR-PLUGS

[75] Inventors: Bert Ake Aslund, Halsingborg; Alf Harald Liljeqvist, Mjohult, both of Sweden

[73] Assignee: Gullfiber AB, Sweden

[22] Filed: Nov. 9, 1970

[21] Appl. No.: 87,699

[52] U.S. Cl. ............................53/23, 53/29, 53/123, 53/183
[51] Int. Cl. ....................................B65b 43/08
[58] Field of Search.................53/29, 123, 24, 28, 53/183, 180, 124, 23; 93/1 WZ; 19/144.5

[56] References Cited

UNITED STATES PATENTS

| | | | |
|---|---|---|---|
| 3,152,428 | 10/1964 | Hill | 53/123 X |
| 3,496,698 | 2/1970 | Wichmann | 53/123 X |
| 3,465,492 | 9/1969 | Jensen | 53/180 X |
| 3,465,390 | 9/1969 | Mooney | 19/144.5 |

Primary Examiner—Granville Y. Custer, Jr.
Assistant Examiner—E. F. Desmond
Attorney—McGlew and Toren

[57] ABSTRACT

The invention relates to the manufacture of a package containing a plurality of ear-plugs. Pieces of mineral fiber felt are successively by means of a plunger pressed through a hole of a mould down into the sleeves of a sleeve band fed below the mould.

15 Claims, 3 Drawing Figures

Patented May 1, 1973

3,729,892

2 Sheets-Sheet 1

INVENTORS:
BERT ÅKE ÅSLUND
ALF HARALD LILJEQVIST

BY McGraw and Toren
ATTORNEYS

METHOD AND A DEVICE FOR MANUFACTURING A PACKAGE CONTAINING A PLURALITY OF EAR-PLUGS

The invention relates to the manufacture of ear-plugs from fine mineral fibers, preferably so-called glass down. More specially, the invention relates to a method and a device for manufacturing a package containing a plurality of ear-plugs of the above mentioned kind.

In order to facilitate distribution and handling of the finished plugs and at the same time protect them against any damage, it has been found desirable to pack the finished plugs in immediate connection with the manufacturing of the plugs. In order to simplify the manufacturing process it is also desirable for the fixing to be omitted or possibly carried out only when the finished plugs have already been packed.

Thus, the object of the present invention is to provide a method of manufacturing a wrapping containing a plurality of easily removable ear-plugs in which the above desired are fulfilled. For this purpose the method according to the invention is characterized in that each ear-plug is formed and packed in one and the same process, wherein a piece of mineral fiber felt by means of a plunger is pressed through a hole in a mould down into a sleeve of a sleeve band fed below the mould.

According to the invention there is also provided a device for carrying out the method according the invention, said device being characterized by a mould having a through-hole, means for successively feeding pieces of mineral fiber felt to a position above the mould, means for stepwise feeding a sleeve band beneath the mould so that the individual sleeves of the band are successively positioned beneath the hole of the mould, and a plunger for pressing a piece of mineral fiber felt through the mould down into a sleeve to form an ear-plug therein.

Figure 3:
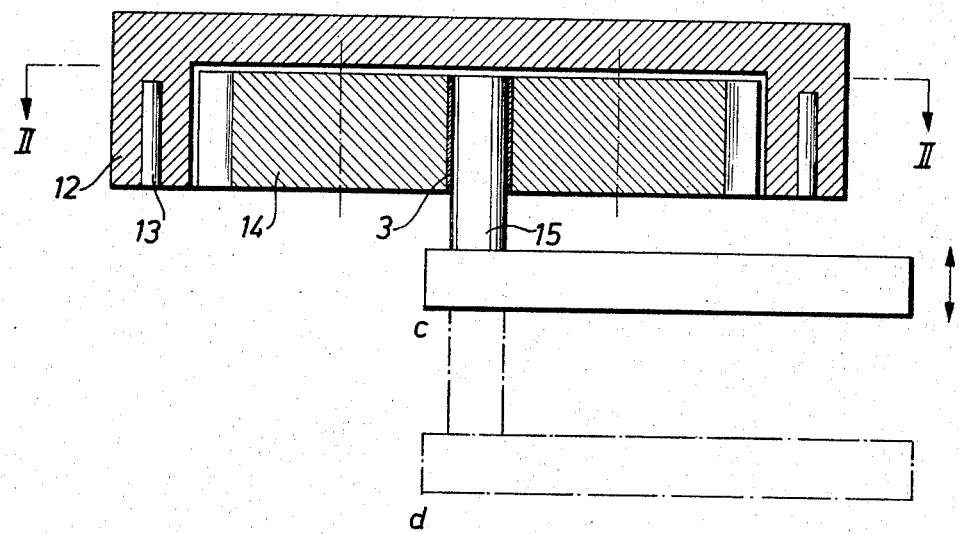
Figure 2:
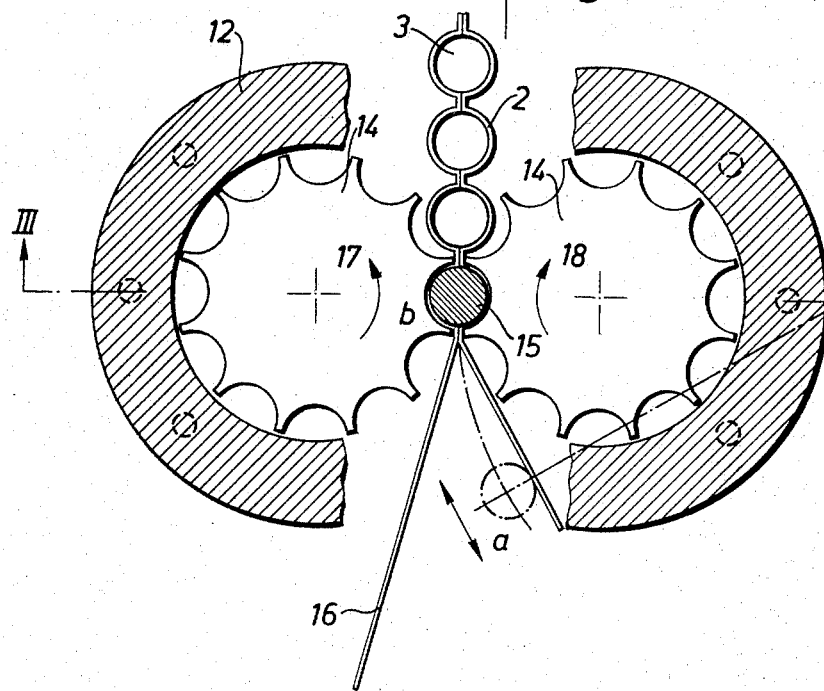

A preferred embodiment of the invention will now be described by way of example with reference to the accompanying drawings. In these, FIG. 1 shows schematically a preferred device for carrying out the method according to the present invention and FIGS. 2 and 3 show how to produce the sleeve band used in said device. FIG. 2 is a section taken along the line II—II in FIG. 3, and FIG. 3 is a section taken along the line III—III in FIG. 2.

The construction shown schematically in FIG. 1 comprises a device 1 for producing a band 2 having a plurality of sleeves 3 into which pieces of a mineral fiber felt 4 are intended to be pressed by means of a plunger 5 moving down and up. The mineral fiber felt 4 is fed over a table 6 and a plate 7. The part of the mineral fiber felt needed for forming an ear-plug 8, i.e. the part positioned above the plate 7, is cut off by a knife 9.

In the plate 7 a mould 10 is arranged, the through-hole 11 of which has a diameter that is the same as or slightly less than the diameter of the sleeves 3. This facilitates the insertion of the mineral fibers into the sleeves. In order to adjust the sleeve correctly in relation to the mould 10 and to prevent the sleeves from being deformed when the mineral fibers are pressed down, it is suitable to arrange supporting and holding members (not shown) for the sleeves. Said member cooperate with the sleeves only during the actual insertion process and are then moved to the side when the band is to be moved forward one step.

The feeding of the band 2 and the mineral fiber felt 4 and also the vertical movements of the knife 9 and the plunger 5 are, of course, synchronized in order to make the manufacturing process as rapid and regular as possible.

The construction and function of the device 1 is clear from FIGS. 2 and 3. The device comprises a housing 12 with heating elements 13 fitted in the walls. Inside the housing there are two toothed wheels 14 in engagement with each other and a mandrel 15 cooperating with said wheels in order to produce the sleeve band 2 from two strips 16 coated with plastic. These strips may, for example, consist of 20 millimeters wide kraft paper coated with polyethylene.

The toothed wheels are stepped in the directions of the arrows 17 and 18. The toothed wheels, heated by radiating heat, weld the sleeves 3 between them. The shape of the sleeves is determined by the mandrel 15 when this is in position $(b; c)$. When a sleeve is finished the mandrel is moved vertically downwards to position $(b; d)$ and then horizontally to position $(a; d)$ and vertically upwards to the starting position $(a; c)$. As the finished sleeve band 2 is fed forward one step, i.e. the distance between two sleeves 3, the mandrel is once again moved to position $(b; c)$. The movement of the mandrel 15 is suitably synchronized with the movement of the toothed wheels 14.

The finished ear-plugs 8 are held together by the sleeves 3 until they are to be used. The length of the sleeve is preferably chosen so that part of the piece of fiber felt forming the earplug projects from the sleeve. This makes the plugs easy to seize by the fingers and they maintain their shape when placed in the auditory canal.

If additional fixing is desired, a binder, for example a wax, may be applied to the projecting part of the plug. The binder is sprayed onto the plugs by means of a nozzle 20, the nozzle communicating with a container 22 for the binder through a conduit 21. If desired, the projecting parts of the plugs may be trimmed before the binder is applied.

It is also possible to provide additional fixing by means of a ring or a tape surrounding the projecting part of an earplug. The ring or the tape, which can be made of paper, flannel or the like, is then positioned between the lower part of the mould and the underlying sleeve so that the plug, after being shaped in the mould, is pressed through the ring or the tape down into the sleeve. The ring or the band may for instance be placed on the above-mentioned sleeve holding members or directly on the upper edge of the sleeves.

An interlayer of gauze or the like may be applied between the mineral fiber felt and the mould.

It must be understood that the invention is not limited to the embodiment described. For instance, instead of a sleeve band having sleeves being open both at the top and at the bottom thereof, in accordance with FIGS. 1–3, a sleeve band, having sleeves being open only at the top, may be used.

We claim:

1. A method of fabricating and packaging a plurality of ear-plugs formed of fine mineral fibers, said method comprising the steps of forming a band of upright interconnected sleeves open at least at the top, moving the band of sleeves in a stepwise manner for positioning the sleeves individually at a packaging station, introducing individual pieces of a mineral fiber felt to the packaging station at a position above and in alignment with the sleeve at the packaging station, positioning a mold member at the packaging station, the mold member having an opening therethrough which has a diameter substantially the same as the diameter of the sleeve, and locating the mold member at the packaging station between the piece of mineral fiber felt and the sleeve with its opening which has a diameter substantially the same size as the diameter of the sleeve in alignment with the sleeve, pressing the piece of mineral fiber felt downwardly through the opening in the mold into the sleeve thus forming an ear-plug held within the sleeve.

2. A method, as set forth in claim 1, wherein the step of pressing the ear-plug includes moving a member having a diameter less than the opening in the mold and in the sleeve downwardly against the piece of mineral fiber felt and forcing the felt into the sleeve.

3. A method, as set forth in claim 1, wherein the step of pressing the ear-plug within the sleeve includes positioning a portion of the material forming the ear-plug extending above the top of the sleeve.

4. A method, as set forth in claim 3, including the further step of applying a binder material on the portion of the material of the ear-plug extending above the top of the sleeve.

5. A method, as set forth in claim 4, wherein the step of applying a binder comprises spraying a wax on the portion of the material forming the ear plug which extends above the top of the sleeve.

6. A method, as set forth in claim 1, wherein the step of introducing individual pieces of a mineral fiber felt comprises feeding a continuous section of the mineral fiber felt toward the packaging station, cutting individual pieces of the continuous section of mineral fiber felt, and supporting each cut piece in position to be pressed downwardly through the opening in the mold into the sleeve.

7. A method, as set forth in claim 1, wherein the step of forming a band of upright interconnected sleeves comprises feeding two separate vertically oriented strips of plastic coated paper to a forming station, shaping the strips at the forming station so that each strip forms half of a sleeve with the half sleeve portions spaced apart by a web, and heat welding the webs of the strips together to form therebetween the sleeves open at the top and bottom.

8. A method, as set forth in claim 1, wherein the step of introducing individual pieces of a mineral fiber felt includes feeding a continuous section of the mineral fiber felt toward the packaging station, cutting individual pieces of the continuous section of mineral fiber felt and supporting the cut pieces in position to be pressed downwardly through the opening in the mold into the sleeve, and the step of forming a band of upright interconnected sleeves comprises feeding two separate vertically oriented strips of plastic coated paper to a forming station, shaping the strips at the forming station so that each strip forms half of a sleeve with the half sleeve portions spaced apart by a web, and heat welding the webs of the strips together to form therebetween the sleeves open at the top and bottom.

9. A method of fabricating and packaging a plurality of ear-plugs comprising steps of feeding the two separate vertically oriented strips of heat-weldable material to a forming station, heat-welding the two strips together at spaced locations and forming vertically extended open ended sleeves between the heat-welded locations, moving the band from the forming station in a step-wise manner for positioning the sleeves individually at a packaging station, aligning an individual piece of mineral fiber felt above each sleeve in the packaging station, pressing the piece of mineral fiber felt downwardly into the sleeve thus forming an ear-plug held within the aligned sleeve with a portion of the mineral fiber felt projecting upwardly from the top of the sleeve.

10. An apparatus for fabricating and packaging a plurality of ear-plugs in a packaging strip, comprises a mold having a vertically extended opening therethrough, means for successively supplying individual pieces of mineral fiber felt to said mold above the opening therethrough, means for forming a band of interconnected upright packaging sleeves with the sleeves open at least at the upper end and with the sleeves having a diameter substantially the same as the diameter of the opening in said mold, means for feeding the band of interconnected packaging sleeves in a step-wise manner with the sleeves oriented vertically for successively aligning each sleeve below the opening in said mold, a plunger associated with said mold and arranged to move in the vertical direction through the opening in said mold for pressing each piece of mineral fiber felt downwardly into the sleeve aligned below the opening for forming an ear-plug held within the sleeve.

11. An apparatus, as set forth in claim 9, wherein said mold forms a support plate surface, and said means for successively supplying pieces of mineral fiber felt to said mold includes means for cutting individual pieces of the mineral fiber felt from a continuous section of the felt.

12. An apparatus, as set forth in claim 10, wherein said means for forming a band comprises a heat-welding device for welding two strips of a plastic coated material at spaced positions along the length of the strips for forming sleeves between the positions at which the strips are welded together.

13. An apparatus, as set forth in claim 10, wherein said mold providing a support plate surface for supporting the individual pieces of mineral fiber felt above the opening in said mold, said means for successively supplying pieces of mineral fiber felt to said mold includes means for cutting individual pieces of the mineral fiber felt from a continuous section of the felt, and said means for forming a band comprises a heat-welding device for welding two strips of a plastic coated material at spaced positions along the length of the strips for forming sleeves between the location of the positions at which the strips are welded together.

14. An apparatus, as set forth in claim 12, wherein said heat-welding device comprises a pair of coplanar rotatable heat wheels, the circumferential periphery of said wheels each having alternating grooves and lands and arranged to cooperate to produce a sleeve forming station at which one groove in the periphery of one said wheel is located in registration with a corresponding groove in the other said wheel, and a mandrel arranged for insertion into the registered grooves for cooperating with the circumferential periphery of said wheels in forming sleeves in the two strips of plastic coated material.

15. An apparatus, as set forth in claim 10, wherein means are provided at a position spaced downstream in the movement of the band of interconnected packaging strips from said mold for spraying a binder on the upper part of said mold located at the top of said sleeves.

* * * * *